United States Patent
Wang et al.

(10) Patent No.: US 10,943,418 B2
(45) Date of Patent: Mar. 9, 2021

(54) METHOD, SERVER, SMART TERMINAL AND STORAGE DEVICE FOR ACCESS AUTHENTICATION

(71) Applicant: JRD Communication (Shenzhen) LTD., Shenzhen (CN)

(72) Inventors: Jia Wang, Shenzhen (CN); Ling Ma, Shenzhen (CN)

(73) Assignee: JRD Communication (Shenzhen) LTD., Shenzhen (CN)

(*) Notice: Subject to any disclaimer, the term of this patent is extended or adjusted under 35 U.S.C. 154(b) by 0 days.

(21) Appl. No.: 16/497,800

(22) PCT Filed: Apr. 17, 2018

(86) PCT No.: PCT/CN2018/083315
§ 371 (c)(1),
(2) Date: Sep. 26, 2019

(87) PCT Pub. No.: WO2018/192472
PCT Pub. Date: Oct. 25, 2018

(65) Prior Publication Data
US 2020/0051348 A1 Feb. 13, 2020

(30) Foreign Application Priority Data

Apr. 19, 2017 (CN) .................. 201710258386.X (51) Int. Cl.
*G06K 5/00* (2006.01)
*G07C 9/20* (2020.01)
(Continued)

(52) U.S. Cl.
CPC .............. *G07C 9/215* (2020.01); *G07C 9/27* (2020.01); *H04L 61/1511* (2013.01); *H04L 67/2842* (2013.01)

(58) Field of Classification Search
CPC .... G06Q 20/20; G06Q 20/206; G06Q 20/385; G06K 19/20; H04L 61/1511;
(Continued)

(56) References Cited

U.S. PATENT DOCUMENTS

2001/0030231 A1* 10/2001 Grossman ................ G07C 9/20
235/375
2009/0041353 A1* 2/2009 Hoff ....................... G06Q 10/10
382/183
(Continued)

FOREIGN PATENT DOCUMENTS

| CN | 104320779 | 1/2015 |
| CN | 105741395 | 7/2016 |

(Continued)

OTHER PUBLICATIONS

International Search Report and the Written Opinion dated Jun. 28, 2018 From the International Searching Authority Re. Application No. PCT/CN2018/083315 and Its Translation of Search Report Into English. (9 Pages).

*Primary Examiner* — Daniel St Cyr (57) ABSTRACT

Disclosed is a method for access authentication. The method includes: receiving profile information of a visitor through a server, and generating a visitor code and transmitting the same to a visitor terminal, and generating a random code based on a valid visitor code, and receiving a decoding result based on decoding the random code and the visitor code by the visit terminal, and predetermining an access authority for the visitor for a predetermined time as the decoding result is successfully matched.

11 Claims, 6 Drawing Sheets

(51) Int. Cl.
*G07C 9/27* (2020.01)
*H04L 29/12* (2006.01)
*H04L 29/08* (2006.01)

(58) Field of Classification Search
CPC ............ H04L 67/2842; H04L 61/2007; H04L 63/0281; H04L 69/40
USPC ................................................ 235/380, 382
See application file for complete search history.

(56) References Cited

U.S. PATENT DOCUMENTS

| | | |
|---|---|---|
| 2011/0013812 A1 | 1/2011 | Shin et al. |
| 2012/0268243 A1* | 10/2012 | Kappeler ................. G07C 9/22 340/5.61 |
| 2013/0292467 A1* | 11/2013 | Avs ......................... G07C 9/22 235/381 |
| 2015/0142605 A1* | 5/2015 | Durante ................. G06Q 20/18 705/26.61 |
| 2015/0156031 A1* | 6/2015 | Fadell ................. G08B 19/005 700/276 |

FOREIGN PATENT DOCUMENTS

| | | |
|---|---|---|
| CN | 106355708 | 1/2017 |
| CN | 107274516 | 10/2017 |
| JP | 2002-213126 | 7/2002 |
| WO | WO 2018/192472 | 10/2018 |

* cited by examiner

FIG. 7

METHOD, SERVER, SMART TERMINAL AND STORAGE DEVICE FOR ACCESS AUTHENTICATION

RELATED APPLICATIONS

This application is a National Phase of PCT Patent Application No. PCT/CN2018/083315 having International filing date of Apr. 17, 2018, which claims the benefit of priority of Chinese Patent Application No. 201710258386.X filed on Apr. 19, 2017. The contents of the above applications are all incorporated by reference as if fully set forth herein in their entirety.

FIELD AND BACKGROUND OF THE INVENTION

The invention relates to a technical field of intelligent terminals, and more particularly to a method, a server, a smart terminal and a storage device for access authentication.

Due to the trade between companies, there are visits of people among the companies to introduce products, negotiate business cooperation mode and provide technical support. Meanwhile, the companies arrange personnel to conduct interviews, and people who need interviews go to the company to negotiate. There is a relationship that A visits the personnel of Company B.

The conventional processing flow is that as A visits B, A needs to register at the front desk, to receive a visit card, and then enters a designated floor with the visit card to have negotiation with B in a designated meeting room.

Such processing wastes both manpower and time.

SUMMARY OF THE INVENTION

An objective of the present invention is to provide a method, a server, a smart terminal and a storage device for access authentication, which can intelligently complete the control and management of relevant information check and access authority before the interview through the visitor code, thus to be simple and convenient for saving manpower and time cost.

In order to solve the above technical problem, the technical solution adopted by the present invention is to provide a server. The server includes a processor, a memory and instructions stored in the memory, wherein the processor executes the instructions to implement following steps: receiving profile information of a visitor from a management terminal; generating a corresponding visitor code based on the profile information of the visitor and transmitting the same to a visitor terminal, wherein the visitor code carries authentication information; receiving a visit time change request from the visit terminal, and forwarding the visit time change request to the management terminal; receiving confirmation information of the management terminal, and regenerating the visitor code based on the profile information of the visitor and a changed visit time, and transmitting the visitor code to the visitor terminal; receiving the visitor code from the visitor terminal, and generating a random code and delivering the random code to the visitor terminal as determining that the visitor code is valid; receiving a decoding result from the visit terminal, and determining that the visitor is a legitimate visitor and predetermining an access authority for the visitor for a predetermined time as the decoding result is successfully matched; issuing an alarm prompt as the predetermined time is up; extending or terminating the access authority of the visitor according to a response of the management terminal to the alarm prompt.

In order to solve the above technical problem, the present invention provides a method for access authentication. The method includes: a server receiving profile information of a visitor from a management terminal; the server generating a corresponding visitor code based on the profile information of the visitor and transmitting the same to a visitor terminal, wherein the visitor code carries authentication information; the server receiving the visitor code from the visitor terminal, and generating a random code and delivering the random code to the visitor terminal as determining that the visitor code is valid; the server receiving a decoding result from the visit terminal, and determining that the visitor is a legitimate visitor and predetermining an access authority for the visitor for a predetermined time as the decoding result is successfully matched.

In order to solve the above technical problem, the present invention provides a server. The server includes a processor, a memory and instructions stored in the memory, wherein the processor executes the instructions to implement following steps: receiving profile information of a visitor from a management terminal; generating a corresponding visitor code based on the profile information of the visitor and transmitting the same to a visitor terminal, wherein the visitor code carries authentication information; receiving the visitor code from the visitor terminal, and generating a random code and delivering the random code to the visitor terminal as determining that the visitor code is valid; receiving a decoding result from the visit terminal, and determining that the visitor is a legitimate visitor and predetermining an access authority for the visitor for a predetermined time as the decoding result is successfully matched.

The technical solutions provided by the present invention have the beneficial effects compared with the prior art: different from the prior art, the present invention generates the visitor code based on the profile information of the visitor and transmits the visitor code to the visitor terminal. The server generates the random code according to the visitor code, and determines an identity of the visitor based on the decoding result of the visitor terminal, thereby predetermining the access authority for the legitimate visitor for the predetermined time. Accordingly, it is possible to intelligently perform visitor information check and access authority control and management before the interview, which is simple and convenient, to simplify the reception work of the conventional negotiation, and to save manpower and time cost.

DESCRIPTION OF SPECIFIC EMBODIMENTS OF THE INVENTION

For the purpose, technical solutions and advantages of the present invention will become clear and unambiguous, the embodiment of the present invention is described in further detail below with reference to the accompanying drawings, simultaneously.

In the following descriptions, for explanation but not limitation, drawings of many skill details are proposed for carefully and thoroughly understanding the present invention. Nevertheless, any persons who are skilled in the art should clearly understand that the present invention can be achieved without the specific details in other embodiments. In other circumstances, the detail descriptions of the well known methods are omitted to avoid that the unnecessary details hinder the description of the present invention.

Figure 1:
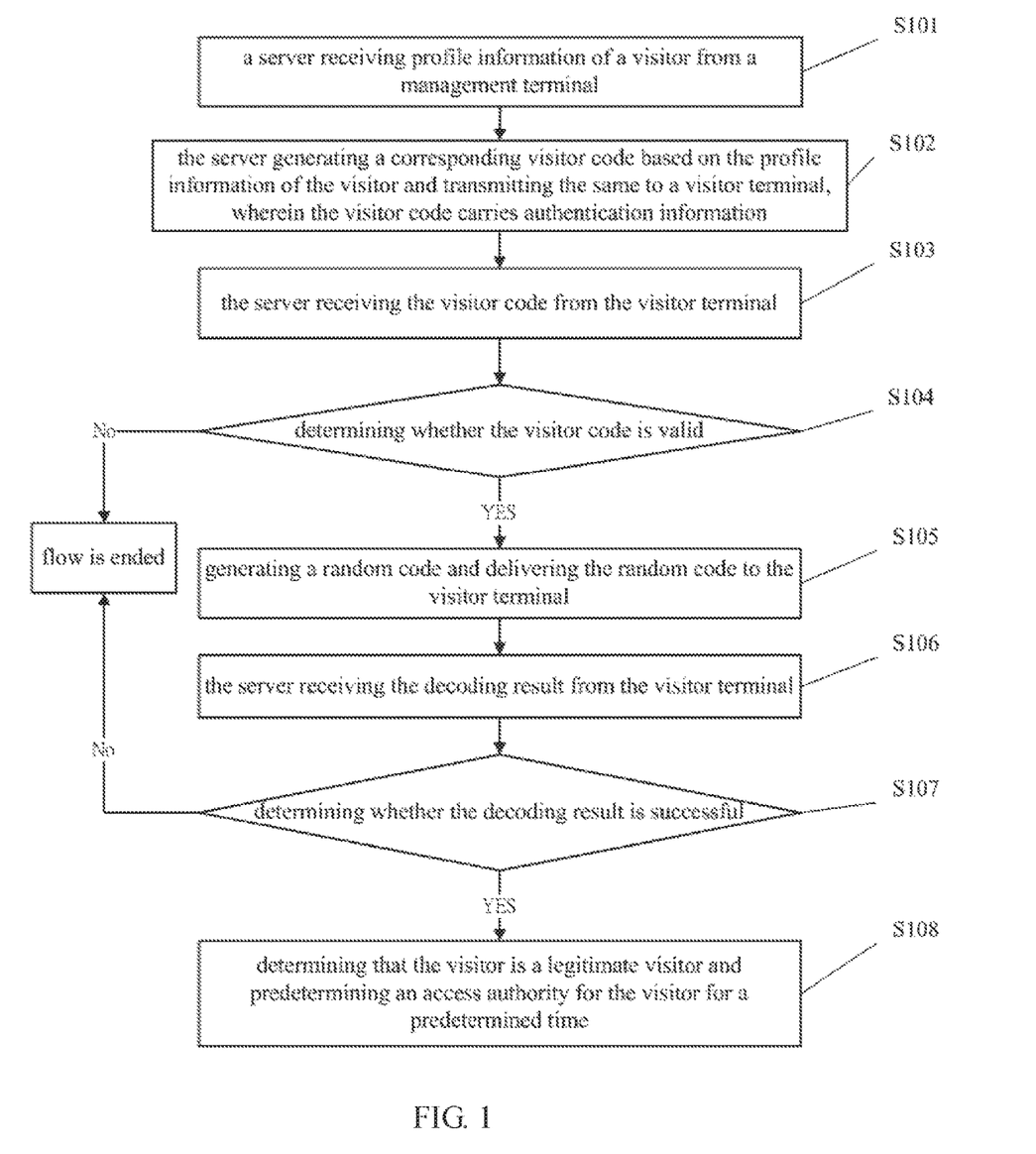
FIG. 1 is a flowchart diagram of a method for accessing authentication provided by the first embodiment of the present invention.

Please refer to FIG. 1. FIG. 1 shows a flowchart diagram of a method for accessing authentication provided by the first embodiment of the present invention. For convenience of explanation, FIG. 1 only shows a portion related to the embodiment of the present invention. The method for access authentication illustrated in FIG. 1 includes following steps:

S101, a server receiving profile information of a visitor from a management terminal;

the management terminal here refers to a legal terminal authorized by the server, for instance, a manager or a staff member of the human resource department of the visited company. The authorization function of the server is obtained to use the visitor code through pre-registration authentication. The terminal of the visited company can connect to the server through legal identity authentication. The method of the legal identity authentication here may be an account password or other authentications. Meanwhile, for the management terminal, different authorizations may be provided. For instance, different roles, such as an interviewer, a human resource staff and a technical staff respectively correspond to different permission levels, which are not specifically limited by the present invention. A terminal that is not authorized by the server, will be considered an illegal terminal by the server. The server does not respond to the visitor code generation request of the illegal terminal.

In the present invention, the management terminal can request the server to generate a visitor code. Specifically, the management terminal initiates a visitor code generation request by uploading profile information of a visitor to the server.

The profile information of the visitor includes, but is not limited to, a visitor's name, a visitor's number, a visitor's business type, the access authority, an entrance authority and an access time. Certainly, it is also possible to further include more personal information of the visitor, which is not limited by illustrations. The business type here refers to the identity of the visitor for visiting, such as, interview, product demonstration or technical support. At the server end, different business types have different databases.

For instance, if the visitor comes to the interview, the visitor information includes the interviewer's name, the interviewer's number, the interview time, the interview location and the specific meeting room for the interview.

The server establishes a connection with the management terminal for receiving the profile information of the visitor from the management terminal.

S102, the server generating a corresponding visitor code based on the profile information of the visitor and transmitting the same to a visitor terminal, wherein the visitor code carries authentication information;

the server generates the corresponding visitor code based on the profile information of the visitor and the visitor code carries the authentication information. Here, the authentication information is used to authenticate the identity of the visitor, including at least an access password, access level control information, an access business type and network information. Certainly, it is not limited thereto, and may further include other information, such as the website homepage of the visited company or the address and the route of the company. The visitor code without the authentication information is considered to be an invalid visitor code. The server does not respond and the visitor cannot obtain the access authority through the invalid visitor code.

Specifically, the visitor code here has a valid time period. Namely, even an authorized legal visitor code is only valid for a certainly authorized period of time, and in the time other than this time period, it is recognized as an invalid visitor code. This time period may be randomly determined by the server based on the visiting time period, or may be the time period specified by the management terminal when the request is made. For instance, the visiting time of the visitor is 2 pm on Apr. 5, 2017. The valid time period may be the server's randomly determined time period from 1:30 pm to 4 pm on Apr. 5, 2017, or other time period specified by the management terminal.

S103, the server receiving the visitor code from the visitor terminal;

during the valid time period of the visitor code, the visitor arrives at the visited place, and the visitor code is scanned by a device, and the visitor code of the visitor terminal is sent to the server, and the server receives the visitor code of the visitor terminal.

S104, determining whether the visitor code is valid;

The server determines whether the visitor code from the terminal belongs to a valid visitor code, such as determining whether the time of receiving the visitor code is within a valid time period and whether the visitor information matches. When it is determined that the visitor code is valid, step S105 is performed.

S105, generating a random code and delivering the random code to the visitor terminal;

When the visitor code from the visitor terminal is determined to be valid, the server generates a random code and transmits the same to the visitor terminal, wherein the random code is used in combination with the visitor code for decoding.

S106, the server receiving the decoding result from the visitor terminal;

after receiving the random code of the server, the visitor terminal combines the visitor code and the random code to decode at software of the visitor to obtain the decoding result, and to transmit the decoding result to the server.

The server further receives the decoding result from the visitor terminal to be matched with a decoding result of the server.

S107, determining whether the decoding result is successful;

when the decoding result from the visitor terminal is consistent with the decoding result of the server, the matching successes, otherwise, the matching fails.

When the matching successes, step S108 is performed, otherwise, the flow is ended.

S108, determining that the visitor is a legitimate visitor and predetermining an access authority for the visitor for a predetermined time.

When the matching successes, it is determined that the visitor is a legitimate visitor and an access authority for the visitor is predetermined for a predetermined time.

The predetermined time here may be a visit time specified by the management terminal, or may be a predetermined time period automatically generated by the server based on the visit time of the visitor.

The access authority may include different access authorities specifically for different visitors. For an interviewer as an illustration, the access authority can be the access permission for the designated floor and the interview room. For the business negotiation personnel as an illustration, the access authority may be the access permission of the designated floor, the wifi authority. The access authority is only valid for the predetermined time period, that is, visitors are unable to open the door or obtain wifi privileges, etc., outside the scheduled time.

In a specific implementation process, the predetermined access authority of the predetermined time generated by the server may be directly sent to the visitor terminal, or may be sent to the management terminal first, and then sent to the visitor terminal by the management terminal.

With the two-factor authentication method in which the visitor code and the random code are combined, even if other people steal the visitor code of the visitor, the access authority cannot be obtained, and the security and reliability of the access are effectively ensured.

Figure 2:
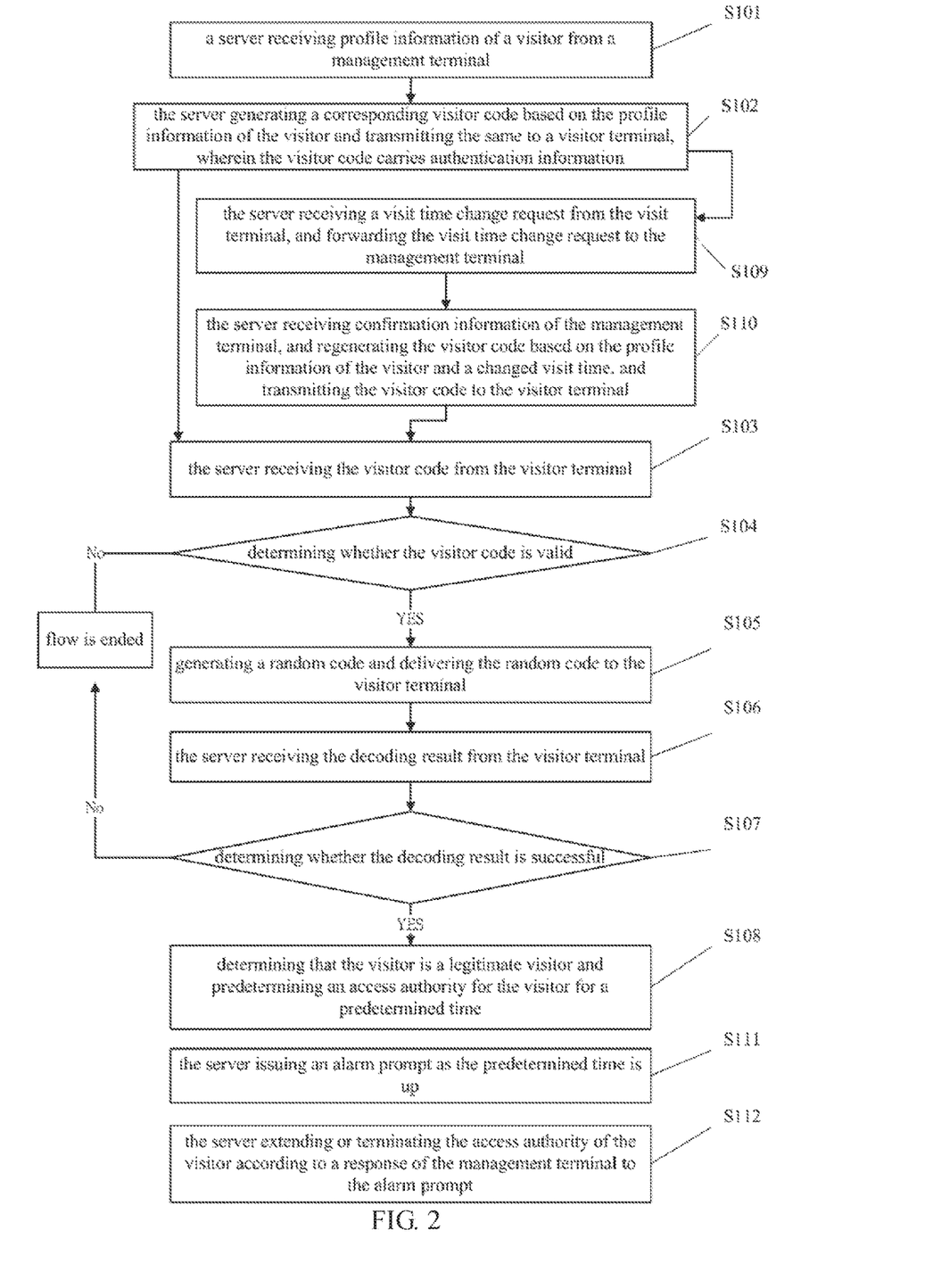
FIG. 2 is a flowchart diagram of a method for accessing authentication provided by the second embodiment of the present invention.

Please refer to FIG. 2. FIG. 2 is a flowchart diagram of a method for accessing authentication provided by the second embodiment of the present invention. The difference from that shown in FIG. 1 is that, in this embodiment, before the server receives the visitor code from the visitor terminal, the method further includes:

S109, the server receiving a visit time change request from the visit terminal, and forwarding the visit time change request to the management terminal;

If the visitor is unable to visit on time due to traffic jam or in case that the temporary visit is needed, the visitor may modify the visit time through the visitor terminal and transmit the visit time change request to the server. In the visit time change request, a plurality of candidate change times may be included for the selected management terminal to select.

The server receives the visit time change request of the visitor terminal, and forwards the request to the management terminal. After the management terminal personnel views the modified request, if they accept the modified request, they choose to agree. If the plurality of the candidate change times provided by the visitor conflicts with other transactions of the interviewed party, the management terminal may continue to change, or choose to delay processing until the two parties determine, and then send a confirmation message to the server.

S110, the server receiving confirmation information of the management terminal, and regenerating the visitor code based on the profile information of the visitor and a changed visit time, and transmitting the visitor code to the visitor terminal.

The server receives the confirmation information of the management terminal, and regenerates the visitor code based on the profile information of the visitor and the changed visit time, and then transmits the visitor code to the visitor terminal. This regenerated visitor code is regenerated based on the new visit time, so its effective time period will change accordingly.

In this embodiment, following steps can be further includes:

S111, the server issuing an alarm prompt as the predetermined time is up;

as the predetermined time is up, the server will send an alert prompt to the management terminal, prompting the access authority of the visitor to be terminated, and the management terminal determines whether to extend or directly terminate the access authority of the visitor. Certainly, in a specific implementation process, the server may issue an alarm prompt before the predetermined time is up, for instance, 5 minutes or 10 minutes before the predetermined time is up, which is not specifically limited.

S112, the server extending or terminating the access authority of the visitor according to a response of the management terminal to the alarm prompt.

The management terminal receives the alarm prompt of the server, and may choose to extend the access authority or terminate the access authority according to the specific negotiation situation.

The server stops the alarm or extends or terminates the access authority of the visitor according to the response of the management terminal.

Figure 3:
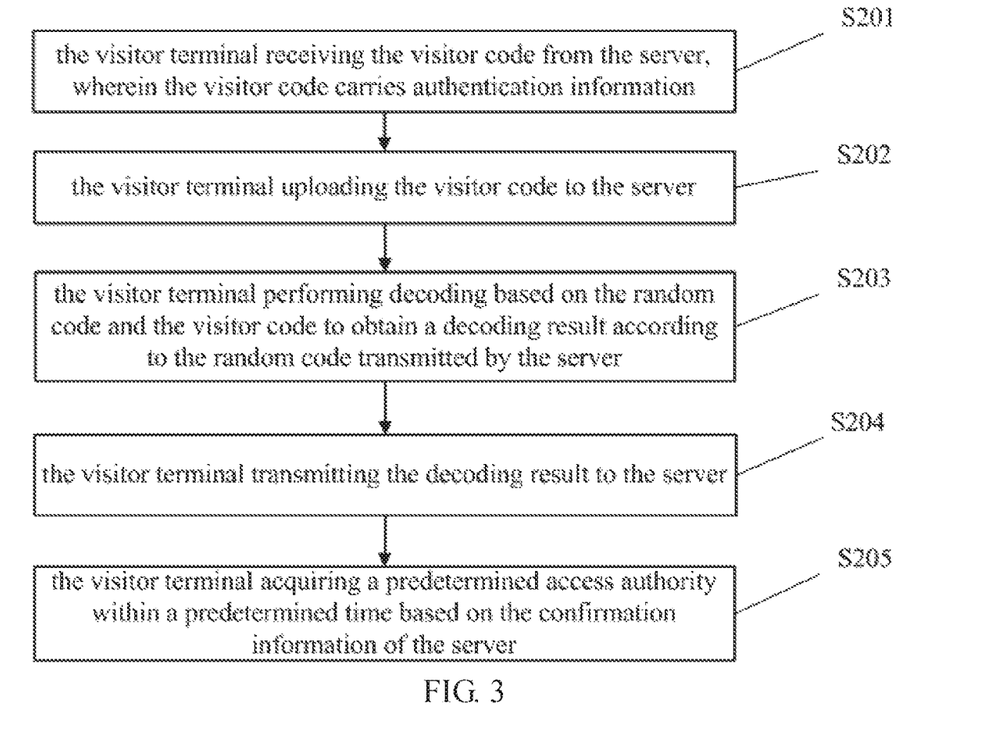
FIG. 3 is a flowchart diagram of a method for accessing authentication provided by the third embodiment of the present invention.

Please refer to FIG. 3. FIG. 3 is a flowchart diagram of a method for accessing authentication provided by the third embodiment of the present invention. As shown in the figure, the method for access authentication in this embodiment includes:

S201, the visitor terminal receiving the visitor code from the server, wherein the visitor code carries authentication information;

In the present invention, the management terminal can request the server to generate a visitor code. Specifically, the management terminal initiates a visitor code generation request by uploading profile information of a visitor to the server.

The profile information of the visitor includes, but is not limited to, a visitor's name, a visitor's number, a visitor's business type, the access authority, an entrance authority and an access time. Certainly, it is also possible to further include more personal information of the visitor, which is not limited by illustrations. The business type here refers to the identity of the visitor for visiting, such as, interview, product demonstration or technical support. At the server end, different business types have different databases.

For instance, if the visitor comes to the interview, the visitor information includes the interviewer's name, the interviewer's number, the interview time, the interview location and the specific meeting room for the interview.

The server establishes a connection with the management terminal for receiving the profile information of the visitor from the management terminal.

the server generates the corresponding visitor code based on the profile information of the visitor and the visitor code carries the authentication information. Here, the authentication information is used to authenticate the identity of the visitor, including at least an access password, access level control information, an access business type and network information. Certainly, it is not limited thereto, and may further include other information, such as the website homepage of the visited company or the address and the route of the company. The visitor code without the authentication information is considered to be an invalid visitor code. The server does not respond and the visitor cannot obtain the access authority through the invalid visitor code.

Specifically, the visitor code here has a valid time period. Namely, even an authorized legal visitor code is only valid for a certainly authorized period of time, and in the time other than this time period, it is recognized as an invalid visitor code. This time period may be randomly determined by the server based on the visiting time period, or may be the time period specified by the management terminal when the request is made. For instance, the visiting time of the visitor is 2 pm on Apr. 5, 2016. The valid time period may be the server's randomly determined time period from 1:30 pm to 4 pm on Apr. 5, 2016, or other time period specified by the management terminal.

The server transmits the visitor code to the visitor terminal, and the visitor terminal receives the visitor code.

S202, the visitor terminal uploading the visitor code to the server;

during the valid time period of the visitor code, the visitor arrives at the visited place, and the visitor code is scanned by a device, and the visitor code of the visitor terminal is sent to the server, and the server receives the visitor code of the visitor terminal.

The server determines whether the visitor code from the terminal belongs to a valid visitor code, such as determining whether the time of receiving the visitor code is within a valid time period and whether the visitor information matches. When it is determined that the visitor code is valid, a random code is generated and transmitted to the visitor terminal, wherein the random code is used in combination with the visitor code for decoding.

S203, the visitor terminal performing decoding based on the random code and the visitor code to obtain a decoding result according to the random code transmitted by the server;

after receiving the random code of the server, the visitor terminal combines the visitor code and the random code to decode at software of the visitor to obtain the decoding result.

S204, the visitor terminal transmitting the decoding result to the server;

the visitor terminal transmits the decoding result to the server, and the server further receives the decoding result from the visitor terminal to be matched with a decoding result of the server. When the decoding result from the visitor terminal is consistent with the decoding result of the server, the matching successes, otherwise, the matching fails.

When the matching successes, the visitor is confirmed as a legitimate visitor, and a confirmation message is transmitted to the visitor terminal.

S205, the visitor terminal acquiring a predetermined access authority within a predetermined time based on the confirmation information of the server.

The visitor terminal acquires the predetermined access authority within the predetermined time based on the confirmation information of the server.

The predetermined time here may be a visit time specified by the management terminal, or may be a predetermined time period automatically generated by the server based on the visit time of the visitor.

The access authority may include different access authorities specifically for different visitors. For an interviewer as an illustration, the access authority can be the access permission for the designated floor and the interview room. For the business negotiation personnel as an illustration, the access authority may be the access permission of the designated floor, the wifi authority. The access authority is only valid for the predetermined time period, that is, visitors are unable to open the door or obtain wifi privileges, etc., outside the scheduled time.

Figure 4:
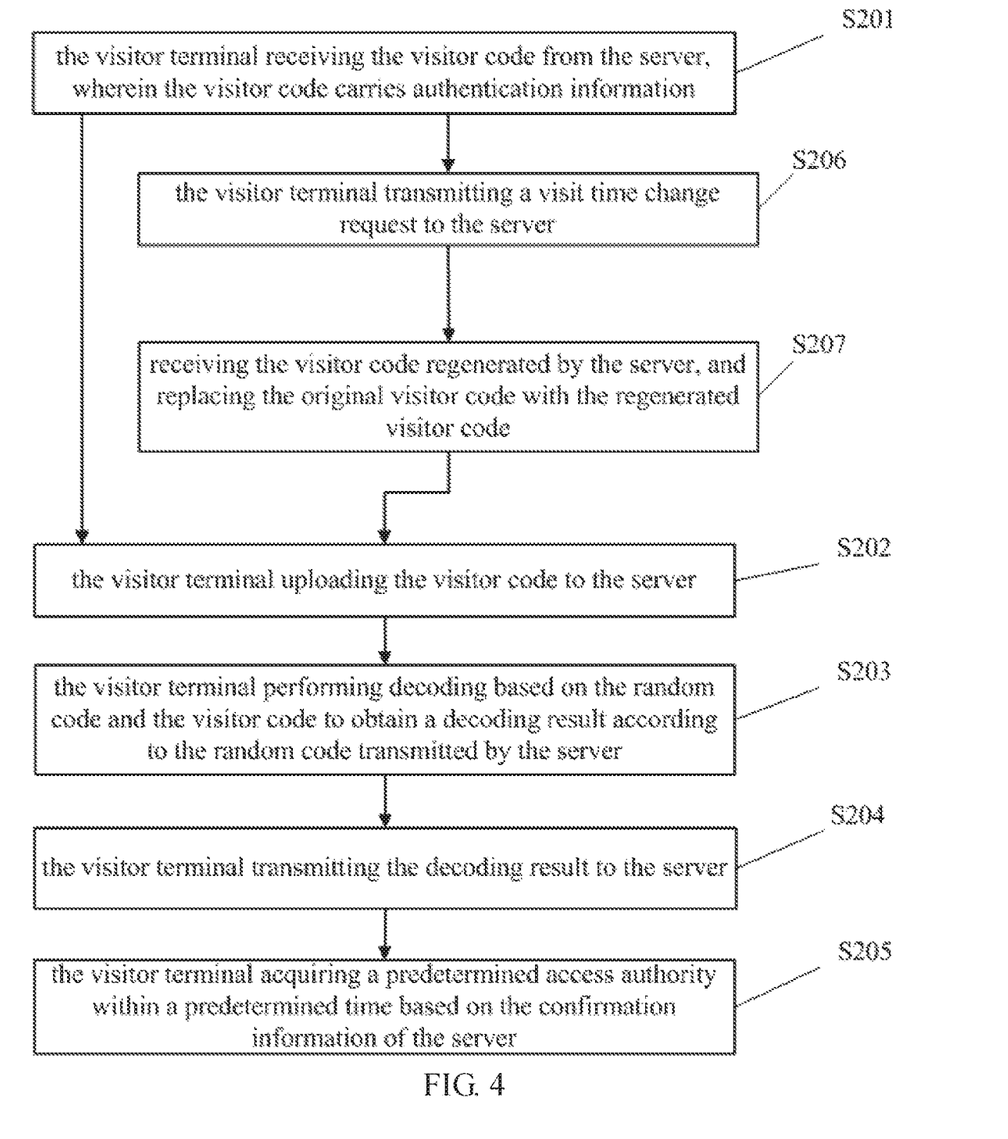
FIG. 4 is a flowchart diagram of a method for accessing authentication provided by the fourth embodiment of the present invention.

Please refer to FIG. 4. FIG. 4 is a flowchart diagram of a method for accessing authentication provided by the fourth embodiment of the present invention. The difference from the embodiment shown in FIG. 3 is that before the visitor terminal uploads the visitor code to the server, the embodiment further includes:

S206, the visitor terminal transmitting a visit time change request to the server;

If the visitor is unable to visit on time due to traffic jam or in case that the temporary visit is needed, the visitor may modify the visit time through the visitor terminal and transmit the visit time change request to the server. In the visit time change request, a plurality of candidate change times may be included for the selected management terminal to select.

The server receives the visit time change request of the visitor terminal, and forwards the request to the management terminal. After the management terminal personnel views the modified request, if they accept the modified request, they choose to agree. If the plurality of the candidate change times provided by the visitor conflicts with other transactions of the interviewed party, the management terminal may continue to change, or choose to delay processing until the two parties determine, and then send a confirmation message to the server.

S207, receiving the visitor code regenerated by the server, and replacing the original visitor code with the regenerated visitor code.

The server receives the confirmation information of the management terminal, and regenerates the visitor code based on the profile information of the visitor and the changed visit time, and then transmits the visitor code to the visitor terminal. This regenerated visitor code is regenerated based on the new visit time, so its effective time period will change accordingly. The server sends the regenerated guest code to the visitor terminal, and the visitor terminal receives the regenerated visitor code and replaces the original visitor code with the regenerated visitor code.

With the detailed description of the method for access authentication of the present invention above, it can be understood that different from the prior art, the present invention generates the visitor code based on the profile information of the visitor and transmits the visitor code to the visitor terminal. The server generates the random code according to the visitor code, and determines an identity of the visitor based on the decoding result of the visitor terminal, thereby predetermining the access authority for the legitimate visitor for the predetermined time. Accordingly, it is possible to intelligently perform visitor information check and access authority control and management before the interview, which is simple and convenient, to simplify the reception work of the conventional negotiation, and to save manpower and time cost.

Furthermore, the method of the present invention can further regenerate a new visitor code flexibly according to the request of the visitor and the adjustment of the visit time to adjust the access authority and the access time in real time based on the actual conditions.

Figure 5:
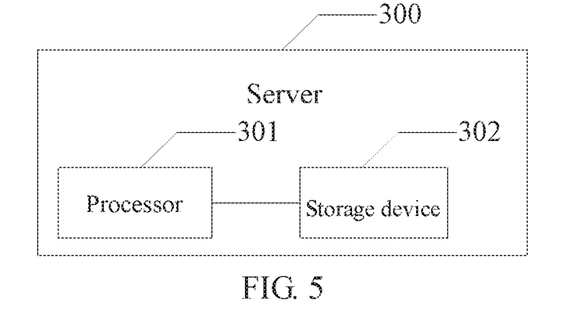
FIG. 5 is a structural diagram of a server provided by an embodiment of the present invention.

Please refer to FIG. 5. FIG. 5 is a structural diagram of a server 300 provided by an embodiment of the present invention. For convenience, FIG. 5 shows only portions related to the embodiment of the present invention, and the server 300 illustrated in FIG. 5 includes a processor 301, a memory 302 and instructions stored on the memory 302.

Optionally, the processor 301 may be a CPU (Central Processing Unit). Alternatively, it can also be an integrated circuit chip with calculation (including judgment) and control capabilities. The processor 301 may also be a general purpose processor, an application specific integrated circuit (ASIC), a field programmable gate array (FPGA) or other programmable logic device, a discrete gate or a transistor logic device or a discrete hardware component, etc., which is not specifically limited herein. The general purpose processor can be a microprocessor or any conventional processor.

The processor 301 is configured to control the server 300 to receive the profile information of the visitor from the management terminal, and to generate the corresponding visitor code based on the profile information of the visitor, and to transmit the corresponding visitor code to the visitor terminal, and to receive the visitor code from the visitor terminal. As determining that the visitor code is valid, the server generates the random code and sends the random code to the visitor terminal, and receives the decoding result from the visitor terminal. When the decoding result is successfully matched, the access authority in the predetermined time is predetermined for the visitor.

The processor 301 is further configured to control the server 300 to receive the visit time change request from the visit terminal, and forward the visit time change request to the management terminal, and regenerate the visitor code based on the profile information of the visitor and the changed visit time, and then transmits the visitor code to the visitor terminal according to the confirmation information of the management terminal.

The processor 301 can further control the server 300 to issue an alarm prompt when the predetermined time is up, and control to extend or terminate the access authority of the visitor according to the response of the management terminal to the alarm prompt.

The memory 302 is configured to store the profile information of the visitor, the visitor code and the decoding result corresponding to each visitor code; the instructions 303 stored by the memory 302 is read and executed by the processor 301 to implement the steps of any of the methods described in the first embodiment or the second embodiment. From the hierarchical structure composed of the server 300, the instructions of the server 300 are divided into micro instructions, machine instructions and macro instructions. The micro instruction is a micro program-level command, belonging to hardware; a macro instruction is a software instruction consisting of several machine instructions, belonging to software; a machine instruction, between the micro instruction and the macro instruction, is usually referred to as an instruction. Each instruction can perform an independent arithmetic operation or logic operation, etc. As aforementioned, to some extent, in intelligent terminal systems (such as computer systems), there is no clear boundary between software and hardware, and software-implemented functions can be implemented by hardware (hardening); hardware-implemented functions can also be implemented (softened) in software, such as popular playback software instead of video cards.

The programs, i.e. the server, can identify the set of instructions that are running, so the server can also include programs, which can include system programs and applications, and the programs can be background services. The system program can be used to connect the server 300 to the network, and can also be used to configure the notification bar of the server 300; it can also be used to monitor the notification bar of the server 300; and can also be used to obtain the received requests and messages. The applications can be used to build interactive platforms and receive interactive information.

Figure 6:
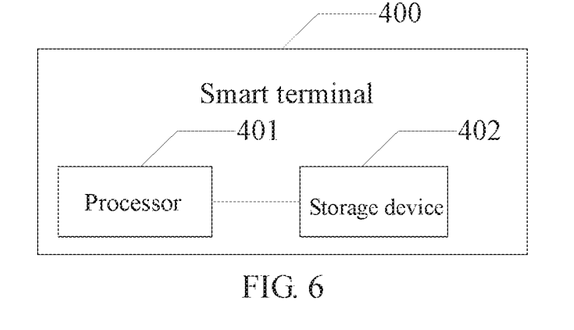
FIG. 6 is a structural diagram of a smart terminal provided by an embodiment of the present invention.

Please refer to FIG. 6. FIG. 6 is a structural diagram of a smart terminal 400 provided by an embodiment of the present invention. For convenience, FIG. 6 shows only portions related to the embodiment of the present invention, and the smart terminal 400 illustrated in FIG. 6 includes a processor 401, a memory 402 and instructions stored on the memory 402.

Optionally, the processor 401 may be a CPU (Central Processing Unit). Alternatively, it can also be an integrated circuit chip with calculation (including judgment) and control capabilities. The processor 401 may also be a general purpose processor, an application specific integrated circuit (ASIC), a field programmable gate array (FPGA) or other programmable logic device, a discrete gate or a transistor logic device or a discrete hardware component, etc., which is not specifically limited herein. The general purpose processor can be a microprocessor or any conventional processor.

The processor 401 is configured to control the smart terminal 400 to receive the visitor code from the server, where the visitor code carries the authentication information. In the predetermined time, the control smart terminal 400 uploads the visitor code to the server, and controls the smart terminal 400 to receive the random code transmitted by the server, and decodes the random code and the visitor code to obtain the decoding result, and sends the decoding result to the server. Based on the confirmation information of the server, the scheduled access authority within the predetermined time is obtained.

The processor 401 is further configured to control the smart terminal 400 to transmit the visit time change request to the server, and to receive the regenerated the visitor code of the server based on the changed visit time and the profile information of the visitor, and to replace the original visitor code with the regenerated visitor code.

The memory 402 is configured to store the visitor code, the random code and a decoding result; the instructions 403 stored by the memory 402 is read and executed by the processor 401 to implement the steps of any of the methods described in the third embodiment or the fourth embodiment. From the hierarchical structure composed of the smart terminal 400, the instructions of the smart terminal 400 are divided into micro instructions, machine instructions and macro instructions. The micro instruction is a micro program-level command, belonging to hardware; a macro instruction is a software instruction consisting of several machine instructions, belonging to software; a machine instruction, between the microinstruction and the macro instruction, is usually referred to as an instruction. Each instruction can perform an independent arithmetic operation or logic operation, etc. As aforementioned, to some extent, in intelligent terminal systems (such as computer systems), there is no clear boundary between software and hardware, and software-implemented functions can be implemented by hardware (hardening); hardware-implemented functions can also be implemented (softened) in software, such as popular playback software instead of video cards.

The programs, i.e. the smart terminal, can identify the set of instructions that are running, so the smart terminal can also include programs, which can include system programs and applications, and the programs can be background services. The system program can be used to connect the smart terminal 400 to the network, and can also be used to configure the notification bar of the smart terminal 400; it can also be used to monitor the notification bar of the smart terminal 400; and can also be used to retrieve the content of the received message displayed in the notification bar. The application can be used to build a chat environment and receive messages from the chat environment.

Optionally, the smart terminal 400 may further include a speaker, a motor, a screen display component, a network card and a communication circuit. The hardware of the smart terminal 400 is connected by a communication circuit, and the instructions may be directly or indirectly transferred to one another to drive the hardware for working.

The speaker can be used to sound to alert the user.

The motor can be used to alert the user by vibration.

The screen display component includes a display technique layer, a touch layer and a glass cover layer, and the display technique layer can be used to brighten or extinguish the screen under the control of the processor, and the touch layer can be used for receiving input operations of the user, and the glass cover layer can be used to protect the display technique layer and the touch layer.

The network card can be used to connect the smart terminal 400 to the network.

The explanation of the corresponding nouns and sentence meanings in the foregoing first and second embodiments can be used in the present embodiment and will not be described here, again.

The embodiment of the present invention provides a storage device on which instruction is stored and the instruction is executed by the processor to implement the steps of any one of the methods described in the first to fourth embodiments.

Figure 7:
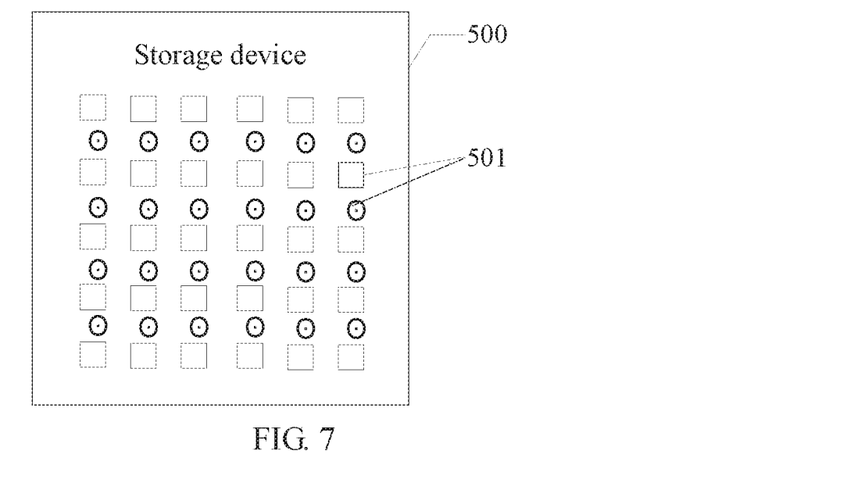
FIG. 7 is a structural diagram of a storage device provided by an embodiment of the present invention.

Please refer to FIG. 7. FIG. 7 is a structural diagram of a storage device 500 provided by an embodiment of the present invention. For convenience, FIG. 7 shows only portions related to the embodiment of the present invention, and the storage device 500 illustrated in FIG. 7 includes instructions 501 stored thereon.

Optionally, a storage device 500, i.e. a device with a storage function may be a carrier for storing data, such as a floppy disk, an optical disk, a DVD, a mechanical hard disk, a solid state hard disk, a flash memory, a USB flash drive, a CF card, an SD card, an MMC card, a SM card, a Memory Stick, an XD card, a gene hard disk, and a storage medium used in various terminals, servers and chips and is not specifically limited here.

The explanation of the corresponding nouns and sentence meanings in the foregoing first to fourth embodiments can be used in the present embodiment and will not be described here, again.

Specifically, the contents of the information interaction and the execution process in the foregoing second, third and fourth embodiments are based on the same concept as the first embodiment of the present invention. The technical effects of the foregoing embodiments are the same as those of the first embodiment of the present invention. For details, refer to the description in the first embodiment of the present invention, and details are not described herein.

The foregoing detailed description of the principles and embodiments of the present invention is merely in more details with reference to specific embodiments thereof. The specific embodiments of the invention are not to be construed as limited to the description but only for the purpose of understanding the method and major idea of the invention; meanwhile, it will be apparent to those skilled in the art, without departing from the teachings of the present invention, it should be considered as falling within the protected scope of the present invention with equivalent structure or equivalent process transformation using the present specification and the accompanying drawings, or directly or indirectly In other related technical fields.

What is claimed is:

1. A server, including a processor, a memory and instructions stored in the memory, wherein the processor executes the instructions to implement following steps:

receiving profile information of a visitor from a management terminal;

generating a corresponding visitor code based on the profile information of the visitor and transmitting the visitor code to a visitor terminal, wherein the visitor code carries authentication information;

receiving a visit time change request from the visit terminal, and forwarding the visit time change request to the management terminal;

receiving confirmation information of the management terminal, and regenerating the visitor code based on the profile information of the visitor and a changed visit time, and transmitting the visitor code to the visitor terminal;

receiving the visitor code from the visitor terminal, and generating a random code and delivering the random code to the visitor terminal as determining that the visitor code is valid;

receiving a decoding result from the visit terminal, and determining that the visitor is a legitimate visitor and predetermining an access authority for the visitor for a predetermined time as the decoding result is successfully matched;

issuing an alarm prompt as the predetermined time is up;

extending or terminating the access authority of the visitor according to a response of the management terminal to the alarm prompt;

wherein the authentication information includes at least an access password, access level control information, an access business type and network information.

2. The server according to claim 1, wherein the profile information of the visitor includes at least a visitor's name, a visitor's number, a visitor's business type, the access authority, an entrance authority and an access time.

3. A method for access authentication, including:

a server receiving profile information of a visitor from a management terminal;

the server generating a corresponding visitor code based on the profile information of the visitor and transmitting the visitor code to a visitor terminal, wherein the visitor code carries authentication information;

the server receiving the visitor code from the visitor terminal, and generating a random code and delivering the random code to the visitor terminal as determining that the visitor code is valid;

the server receiving a decoding result from the visit terminal, and determining that the visitor is a legitimate visitor and predetermining an access authority for the visitor for a predetermined time as the decoding result is successfully matched;

wherein the authentication information includes at least an access password, access level control information, an access business type and network information.

4. The method for access authentication according to claim 3, wherein before the server receives the visitor code from the visitor terminal, the method further includes:

the server receiving a visit time change request from the visit terminal, and forwarding the visit time change request to the management terminal;

the server receiving confirmation information of the management terminal, and regenerating the visitor code based on the profile information of the visitor and a changed visit time, and transmitting the visitor code to the visitor terminal.

5. The method for access authentication according to claim 4, wherein the profile information of the visitor includes at least a visitor's name, a visitor's number, a visitor's business type, the access authority, an entrance authority and an access time.

6. The method for access authentication according to claim 3, wherein the method further includes:

the server issuing an alarm prompt as the predetermined time is up;

the server extending or terminating the access authority of the visitor according to a response of the management terminal to the alarm prompt.

7. The method for access authentication according to claim 3, wherein the profile information of the visitor includes at least a visitor's name, a visitor's number, a visitor's business type, the access authority, an entrance authority and an access time.

8. A server, including a processor, a memory and instructions stored in the memory, wherein the processor executes the instructions to implement following steps:

receiving profile information of a visitor from a management terminal;

generating a corresponding visitor code based on the profile information of the visitor and transmitting the visitor code to a visitor terminal, wherein the visitor code carries authentication information;

receiving the visitor code from the visitor terminal, and generating a random code and delivering the random code to the visitor terminal as determining that the visitor code is valid;

receiving a decoding result from the visit terminal, and determining that the visitor is a legitimate visitor and predetermining an access authority for the visitor for a predetermined time as the decoding result is successfully matched;

wherein the authentication information includes at least an access password, access level control information, an access business type and network information.

9. The server according to claim 8, wherein before receiving the visitor code from the visitor terminal, the processor further executes the instructions to implement following steps:

receiving a visit time change request from the visit terminal, and forwarding the visit time change request to the management terminal;

receiving confirmation information of the management terminal, and regenerating the visitor code based on the profile information of the visitor and a changed visit time, and transmitting the visitor code to the visitor terminal.

10. The server according to claim 8, wherein the processor further executes the instructions to implement following steps:

issuing an alarm prompt as the predetermined time is up;

extending or terminating the access authority of the visitor according to a response of the management terminal to the alarm prompt.

11. The server according to claim 8, wherein the profile information of the visitor includes at least a visitor's name, a visitor's number, a visitor's business type, the access authority, an entrance authority and an access time.

\* \* \* \* \*